United States Patent
Kosick et al.

(10) Patent No.: US 10,882,057 B2
(45) Date of Patent: Jan. 5, 2021

(54) APPARATUS FOR DIRECT RECOVERY OF MINERAL VALUES AS A BUBBLE-SOLIDS AGGREGATE

(71) Applicant: 2678380 Ontario Inc., Toronto (CA)

(72) Inventors: Glenn Kosick, Toronto (CA); Glenn Dobby, Ontario (CA); Catherine McInnes, Toronto (CA)

(73) Assignee: 2678380 Ontario Inc., Toronto (CA)

( * ) Notice: Subject to any disclaimer, the term of this patent is extended or adjusted under 35 U.S.C. 154(b) by 0 days.

(21) Appl. No.: 16/544,321

(22) Filed: Aug. 19, 2019

(65) Prior Publication Data
US 2019/0366355 A1 Dec. 5, 2019

Related U.S. Application Data

(62) Division of application No. 16/335,334, filed as application No. PCT/CA2017/051097 on Sep. 18, 2017.
(Continued)

(51) Int. Cl.
*B03D 1/16* (2006.01)
*C02F 1/24* (2006.01)
(Continued)

(52) U.S. Cl.
CPC .............. *B03D 1/16* (2013.01); *B03D 1/02* (2013.01); *B03D 1/12* (2013.01); *C02F 1/24* (2013.01); *C02F 2103/10* (2013.01)

(58) Field of Classification Search
CPC ...................................................... B03D 1/16
See application file for complete search history.

(56) References Cited

U.S. PATENT DOCUMENTS

| 3,339,730 A | 9/1967 | Boutin et al. |
| 4,436,617 A | 3/1984 | Moore et al. |

(Continued)

FOREIGN PATENT DOCUMENTS

| CA | 2561539 A1 | 3/2008 |
| CL | 201601747 A1 | 1/2017 |

(Continued)

OTHER PUBLICATIONS

Falutsu, M., Dobby, G.S., 1989. Direct measurement of froth dropback and collection zone recovery in a laboratory flotation column. Minerals Engineering 2 (3), 377-386.
(Continued)

*Primary Examiner* — Peter Keyworth
(74) *Attorney, Agent, or Firm* — Westman, Champlin & Koehler, P.A.

(57) ABSTRACT

A method and apparatus for the recovery of hydrophobic particles from a slurry comprised of water, the hydrophobic particles, and a hydrophilic component. Slurry is exposed to a gas stream to permit bubbles to adhere to the hydrophobic particles. The slurry generally flows vertically through a vessel at a velocity that maintains gas hold-up at least between 30 and 70% to maintain a bubbly flow without a slurry froth interface so that a portion of the water of the slurry, together with entrained gas bubbles attached to hydrophobic particles, flows out of the vessel with a portion of the water of the slurry and the hydrophilic component remaining in the vessel. Water from the slurry and gas bubbles attached to hydrophobic particles flowing through the vessel is discharged and collected for processing. A portion of the hydrophilic component is extracted as tailings for disposal or subsequent processing.

14 Claims, 4 Drawing Sheets

Related U.S. Application Data

(60) Provisional application No. 62/397,394, filed on Sep. 21, 2016.

(51) Int. Cl.
*B03D 1/12* (2006.01)
*B03D 1/02* (2006.01)
*C02F 103/10* (2006.01)

(56) References Cited

U.S. PATENT DOCUMENTS

| | | | |
|---|---|---|---|
| 4,938,865 | A | 7/1990 | Jameson |
| 5,096,572 | A | 3/1992 | Hwang |
| 5,205,926 | A | 4/1993 | Lawrence |
| 5,249,688 | A | 10/1993 | Hwang |
| 5,746,910 | A | 5/1998 | Negeri |
| 8,960,443 | B2 | 2/2015 | Mankosa et al. |
| 2003/0052061 | A1 | 3/2003 | Burke |
| 2009/0250383 | A1 | 10/2009 | Young et al. |
| 2013/0334125 | A1 | 12/2013 | Blendinger et al. |
| 2013/0341251 | A1 | 12/2013 | Blendinger et al. |
| 2015/0108044 | A1 | 4/2015 | Mankosa et al. |
| 2016/0016816 | A1* | 1/2016 | Anderson ............... B03D 1/24 210/703 |
| 2017/0144170 | A1 | 5/2017 | Dobby et al. |

FOREIGN PATENT DOCUMENTS

| | | |
|---|---|---|
| WO | WO2011/094842 A1 | 8/2011 |
| WO | 2015103662 A1 | 7/2015 |

OTHER PUBLICATIONS

Finch, J. A. and Dobby, G.S. "Column Flotation," Pergamon Press, London, ISBN 0-08-040186-4. (1990). 200 pages.
International Search Report and Written Opinion issued in International Application No. PCT/CA2017/051097, dated Dec. 19, 2017.
International Preliminary Report on Patentability issued in International Application No. PCT/CA2017/051097, dated Jan. 11, 2019.
Office Action issued in corresponding Chilean Application No. CL201900717, dated Mar. 6, 2020.

* cited by examiner

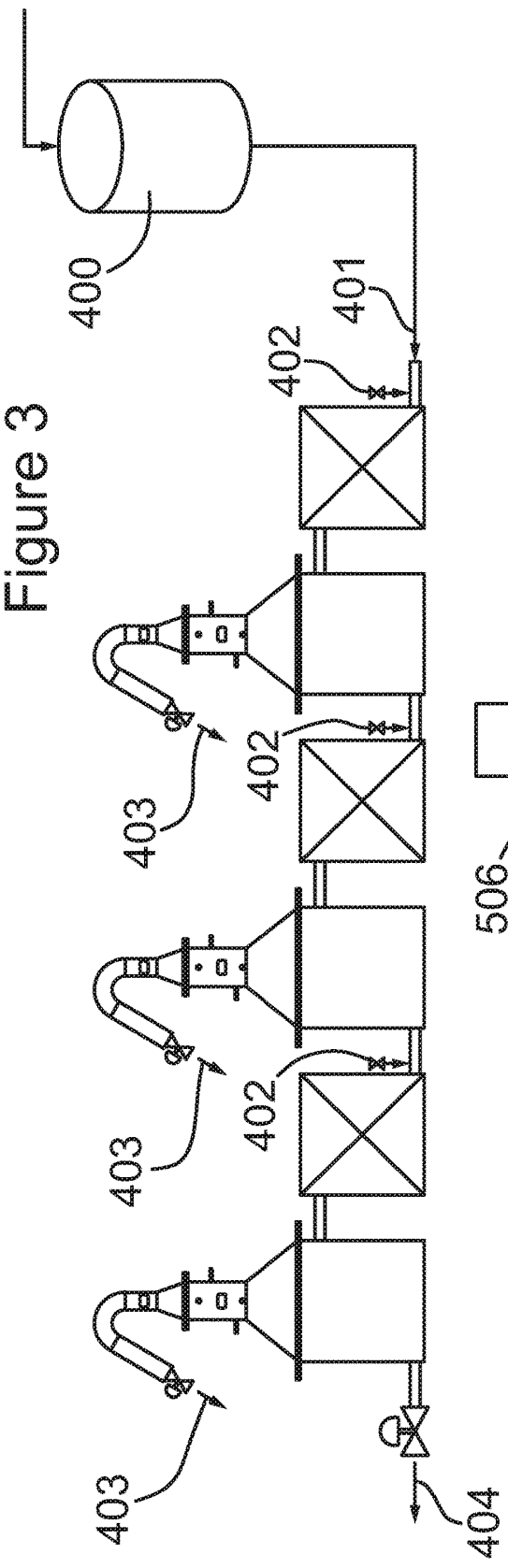
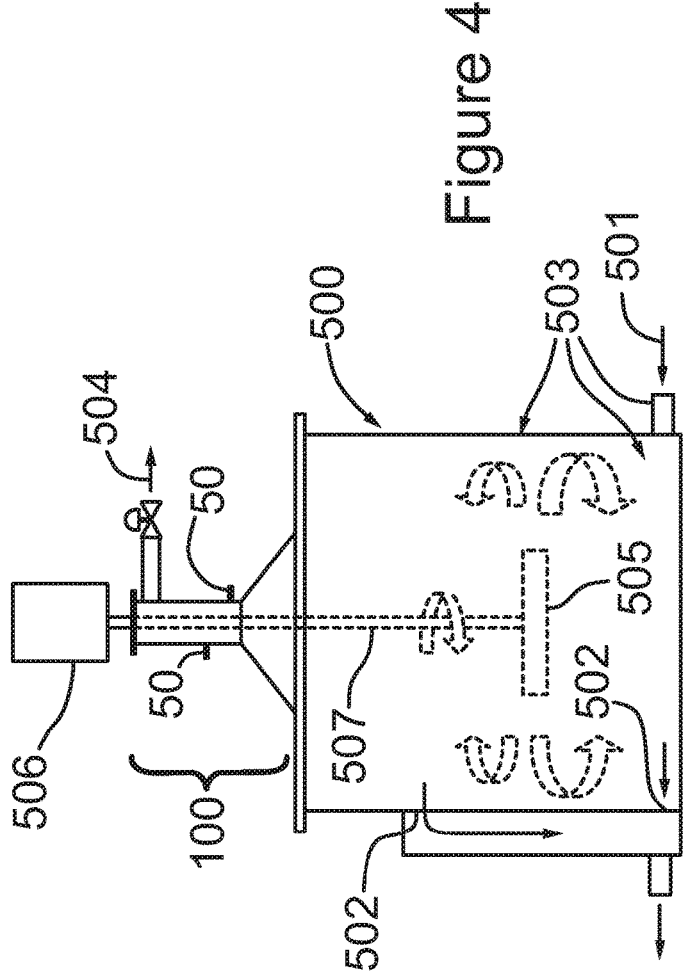

APPARATUS FOR DIRECT RECOVERY OF MINERAL VALUES AS A BUBBLE-SOLIDS AGGREGATE

CROSS REFERENCE TO RELATED APPLICATIONS

This Application is a division of U.S. patent application Ser. No. 16/335,334, filed Mar. 21, 2019. This application further claims priority to International Application PCT/CA2017/051097, filed Sep. 18, 2017 and U.S. Provisional Patent Application Ser. No. 62/397,394, filed Sep. 21, 2016, each of which is hereby incorporated by reference in its entirety.

FIELD

This invention relates to the field of mineral recovery through flotation, and in particular to a method and apparatus for the recovery of mineral values without the establishment of a froth phase.

BACKGROUND

Froth flotation has been used for more than a century in the mining industry to separate mineral particles from waste particles in slurries. Other resource industries use froth flotation to separate such things as oil from sand or waste, and ink and/or waste from pulp in the pulp and paper industry. The current invention applies most significantly to flotation as it relates to mining and minerals processing, oil flotation and the de-inking industry.

Froth flotation is employed in the mining industry after rock has been mined, crushed, and ground to the consistency of mud, and then diluted with water, typically to approximately 25% to 40% solids by weight. The resulting mixture is referred to as a slurry. Once the ore is in slurry form, it can be subjected to froth flotation to separate the desired mineral from the waste or sand particles.

The process of froth flotation commonly involves several steps, that include: (i) adding chemicals called surfactants to the slurry to reduce the surface tension of the water in the slurry and, in the case of minerals, to selectively coat mineral surfaces with a molecular layer of surfactant, thus causing the mineral to become hydrophobic; (ii) providing a gas stream (commonly air) into the slurry which is contained in a vessel; (iii) providing a form of energy (generally achieved through agitation) to break up the gas stream into gas bubbles and to force the selectively coated mineral particles onto the gas bubbles; (iv) permitting the gas bubbles carrying the mineral particles to rise within the slurry, to be exposed to the air or to atmospheric conditions that allow the bubbles to expand creating a mineral laden froth and a distinct froth slurry interface; and then (iv) removing the mineral laden froth from the surface of the vessel for subsequent processing by more flotation units or by other process operations.

The traditional method to achieve particle/bubble contact and froth recovery utilizes an agitator in an open topped vessel to stir the slurry rigorously, create gas bubbles from the supplied gas, and force the particles onto the gas bubbles (gas is typically either injected or aspirated down the shaft of the agitator). The bubbles then rise to the top of the vessel where they coalesce to form a froth which spills over the top lip of the vessel. Such mechanically agitated flotation vessels are referred to as mechanical cells, tank cells or conventional cells.

There are other vessels used for froth flotation. They include column flotation cells, Pneumatic cells, and Staged Flotation Reactor [SFR] units. Froth flotation in these forms of vessels is affected by (i) bubble/particle contact; (ii) froth formation; and then (iii) froth recovery to a launder. In each instance the mineral laden gas bubbles float to the top of a vessel where they form a froth and a froth slurry interface, after which the mineral laden froth is subsequently removed to report to another stage of flotation, or another processing operation.

The recognized method in all of the above examples, as well as other known flotation machines, for removing the mineral laden gas bubbles from the flotation vessel is for the gas bubbles to sufficiently coalesce to form a mineral froth phase. The mineral froth phase is then allowed to pour over the top lip of the flotation vessel into a launder for collection.

A mineral froth is a three-phase system comprising a gas phase, a slurry phase (suspended particles in liquid), and discrete particles attached to the gas-liquid interface. The gas hold-up ($E_g$) in a mineral froth is typically higher than 90% by the time the froth leaves the vessel. At this point the gas phase in a mineral froth will generally no longer exist as discrete spherical gas bubbles, but instead as a coalesced phase of three-dimensional polyhedral shapes with distinct borders between them. The contained solution in the froth phase exists as a slurry liquid held up along the walls of the polyhedral gas foam. This slurry liquid comprises a solution medium (usually water), floatable particles that have become detached from the gas bubbles, and gangue (solid) particles which are present in the froth phase not through attachment, but through entrainment.

As mentioned, in mineral froths there is a distinct interface between the slurry phase and the froth phase. The rise velocity of mineral-laden gas bubbles slows down dramatically as the bubbles travel over the phase boundary between the slurry phase and the froth phase. The dramatic deceleration of the bubbles at, or near, the phase boundary causes the coalescence of the discrete spherical bubbles into a mineral froth. Coalescence, with a resultant overall reduction in bubble surface area, can at times cause mineral particles to detach from the bubble surface and to drop back into the slurry phase (a phenomenon referred to as froth drop-back). In the case of currently used flotation cells these particles fall back into the slurry and may be recollected within that vessel, or they may report to a subsequent collection stage for recovery.

Definition of Terms

The following terms have the following meanings within the context of this document.

Product Stream: The concentrated (normally valued) product stream at the top of the direct flotation equipment.

Gas hold-up ($E_g$j Ratio of gas-phase volume to total slurry system volume, expressed as either a fraction or a percentage.

Qc: Volumetric flow rate of the product stream (solids and water) exiting the system.

Qcw: Volumetric flow rate of water contained in the product stream.

Qg: Volumetric flow rate of gas delivered to the system.

Qww: Volumetric flow rate of flush water delivered to the system.

Mcs: Product stream solids mass flow.

Rcg: Gas rate fraction–the ratio of Qg to (Qg+Qc).

Flush efficiency: Ratio of flush water flow rate delivered to the system to water flow rate in the product stream, i.e. the ratio of Qww to Qcw.

Yb: Solids to gas ratio—the ratio of Mcs to Qg (e.g. kg/min solids to l/min gas rate, or kg/liter).

Froth phase: a distinct 3-phase system of solid particles, polyhedral gas foam and liquid slurry. In a froth phase, typically $E_g$ is above 90%.

Bubbly flow: a 3-phase system of a bubble-solids aggregate and a liquid slurry without the establishment of a froth.

Bubble-solids aggregate: A mineral laden aggregate comprising solid mineral particles adhered to discrete spherical gas bubbles.

Froth recovery (%): Percentage of particles entering the froth phase, and attached to gas bubbles, that are recovered over the top lip of a flotation vessel as part of the coalesced froth.

Bubble recovery: The recovery of mineral-laden bubbles into a distinct product from the flotation equipment, without coalescence of the spherical gas bubbles.

Direct Flotation: The recovery of a product stream from the top of a flotation vessel in the form of a bubbly flow stream, without significant bubble coalescence into a froth phase.

SUMMARY

The present invention may be embodied in a number of different forms. The specification and drawings that follow describe and disclose some of the specific forms of the invention.

The invention in one aspect provides a method for the recovery of hydrophobic particles from a slurry that is comprised of water, the hydrophobic particles, and a hydrophilic component, the method comprising (i) exposing the slurry to a gas stream to permit gas bubbles to adhere to the hydrophobic particles forming a slurry comprising water, the hydrophilic component, hydrophobic particles, and hydrophobic particles adhered to gas bubbles, (ii) allowing the slurry to generally flow vertically through a vessel at a velocity that maintains the gas hold-up in the slurry at least between 30 and 70% to maintain a bubbly flow without the formation of a slurry froth interface such that a portion of the water of the slurry, together with entrained gas bubbles attached to hydrophobic particles, flows out of the vessel with a portion of the water of the slurry and the hydrophilic component remaining in the vessel, (iii) discharging that portion of the water from the slurry and the gas bubbles attached to hydrophobic particles that flows vertically through the vessel and collecting the discharge for further processing, and (iv) extracting a portion of the hydrophilic component from the vessel as tailings for disposal or subsequent processing.

In another aspect the invention provides an apparatus for use in the recovery of hydrophobic particles from a slurry that is comprised of water, hydrophobic particles, and a hydrophilic component, the apparatus comprising (i) a bubble engagement tank into which the slurry is fed, said bubble engagement tank including an air injector to inject air into slurry received within the bubble engagement tank to permit gas bubbles to adhere to hydrophobic particles within the slurry, (ii) a direct flotation vessel in fluid communication with the bubble engagement tank, said direct flotation vessel having a first or intake end in fluid communication with said bubble engagement tank, at least one reduced diameter section, and a discharge end; and, (iii) a control valve in fluid communication with said discharge end such that operation of said control valve controls the amount of flow through said direct flotation vessel when slurry from the bubble disengagement tank flows there through, at least one of the at least one reduced diameter sections of the direct flotation vessel, together with the control valve, maintaining the velocity of that portion of the slurry passing through the direct flotation vessel to maintain a bubbly flow without the formation of a slurry froth interface or a froth component, such that a portion of the water of the slurry, together with entrained gas bubbles attached to hydrophobic particles, is discharged through said control valve with a portion of the water of the slurry and the hydrophilic component remaining in the bubble engagement tank.

BRIEF DESCRIPTION OF THE DRAWINGS

For a better understanding of the invention, and to show more clearly how it may be carried into effect, reference will now be made, by way of example, to the accompanying drawings which show exemplary embodiments of the present Invention in which:

FIG. 2 displays portions of a flotation unit that comprise the invention, as well as portions which do not specifically comprise the invention, including a slurry feed delivery system, a gas addition system and a means for providing sufficient shear to create gas bubbles and particle-bubble adhesion. FIG. 2 exemplifies an improvement upon current flotation machines achieved through combining a direct flotation device in accordance with an embodiment of the present invention with a means for providing sufficient shear to create gas bubbles and particle-bubble adhesion.

FIG. 3 is a schematic view of three flotation units in series showing generic gas/slurry contacting vessels in operation with an embodiment of the direct flotation equipment of the current invention.

FIGS. 4 through 6 are sample schematics of alternate arrangements of flotation units employing direct flotation equipment in accordance with embodiments of the invention, where the gas/slurry contacting vessel and gas/slurry disengagement vessel are combined into a single tank.

DESCRIPTION

Figure 1:
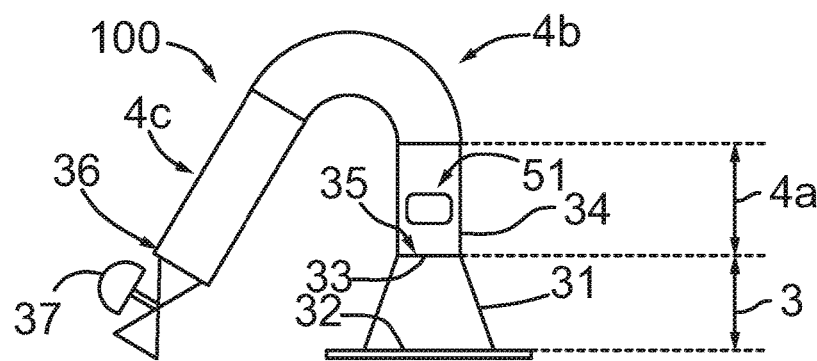
FIG. 1 is a schematic drawing of an embodiment of the invention showing the particular zones which may make up a direct flotation apparatus.

The invention may generally be referred to as "direct flotation". Direct flotation is the recovery of a product stream from the top of a flotation vessel, in the form of a bubbly flow stream, without bubble coalescence into a froth phase. The equipment which embodies the mechanisms of direct flotation is referred to as the bubble capture device. The mechanisms of direct flotation and the device which embodies the mechanisms of direct flotation are both aspects of an embodiment of the invention.

From an understanding of the invention as described below it will be appreciated that the invention is primarily focused on the process that follows after mineral particles have been attached onto gas bubbles. The manner by which the mineral particles become attached to the gas bubbles is not particularly critical to the invention, and can be accomplished in numerous ways commonly known to those in the art. Similarly, the particular vessel in which the mineral particles become attached to the gas bubble is also not specifically relevant to the invention.

An aspect of the invention comprises a flotation product recovery device where the sections of the product recovery device are sequentially reduced in diameter, in order to maintain a sufficiently high slurry/bubble upward velocity, to maintain bubbly flow of the product bubble-solids aggregate stream.

The invention contemplates a high gas hold-up ($\varepsilon_g$) of approximately 30 to 70% in a bubbly flow regime with no formation of a froth phase. It may be possible to extend beyond this range, as long as a slurry froth interface isn't formed, but efficiency may be reduced. The invention also contemplates a sufficiently high upward velocity of the bubble-solids aggregate stream to maintain bubbly flow and prevent the coalescence of discrete spherical gas bubbles into a bubble froth.

A flush water phase may be injected into a restricted diameter zone of the direct flotation device, as a mechanism to displace entrained solids in the product stream. The water flush efficiency (Qww to Qcw) is preferably maintained at a typical range of 0.8 to 2.0, depending on the degree of primary mineral upgrading that is desired for a given stage in the flotation circuit. However, it may be lower or higher than this range, as required to achieve the desired product quality. Preferably, the gas flow rate delivered to the system (Qg) is set at a minimum rate, as required for particle-bubble collection. The product stream volumetric flow rate (Qc) is preferably controlled to maintain a target Rcg [gas rate ratio]. The product stream volumetric flow rate (Qc) may be controlled through a mechanical means, via a regulated control valve, via regulated pump speed, or by other means.

The flush water phase may be a stream of water with no suspended solids. Alternatively, the water of the flush water phase may be the water within a slurry of water and solids. Such a slurry normally would be a portion of the previously collected product slurry, or from another direct flotation machine used in the flotation plant process. In this manner, water consumption can be reduced and a product of higher slurry percent solids can be produced. The flush water phase may also be a combination of water with no suspended solids and water with suspended solids, entering at different points of the restricted diameter zone.

An embodiment the invention provides a restricted diameter zone for efficient water flush of the product stream. There may also be included a visualization section for a camera to send a signal to an image analysis system that will utilize the image analysis results regarding bubble size, bubble velocity and gas holdup to help to regulate frother dosage (used to control or reduce bubble size), air flow rate and product flow rate.

FIG. 1 illustrates five primary zones of a direct flotation device or vessel 100 in accordance with one of the preferred embodiments of the invention. Direct flotation device 100 is in the form of an enclosed vessel having intake and discharge ends and, in the embodiments shown, comprises a pipe, conduit or duct. A description of each of the five zones is provided as follows.

The first zone 1 may be referred to as a diameter-reduction section. The upward flow of a product stream passes from either a generic quiescent vessel 200 for gas slurry disengagement or directly from a bubble engagement tank or vessel into first section 1 of the direct flotation device. The product stream comprises (i) discrete spherical gas bubbles; (ii) mineral solids particles present as hydrophobic particles attached to the surfaces of the gas bubbles; and (iii) entrained slurry carried in-between the spherical gas bubbles. The entrained slurry comprises entrained solids and the liquid carrier medium. Since the gas bubbles are retained within the slurry they are not exposed to atmospheric or pressure conditions that permit an expansion of the bubbles and the formation of either a slurry froth interface or froth. As shown, section 1 may be a first conical section 25 where the diameter is steadily reduced in a downstream direction according to the cone angle. As the diameter is reduced, the upward velocity of the product stream increases accordingly. In alternate embodiments other geometric means or shapes can be used to effectively increase the upward velocity. As will be discussed in more detail below, first section 1 may take the form of a separate and distinct vessel, manifold or pipe structure or, alternately, may be an integral part of a larger tank or vessel of the flotation system or flotation machine. The first conical section has a first downstream end 26 that is of a larger diameter than its second upstream end 27. First end 26 comprises the intake end of direct flotation device or vessel 100 and is in fluid communication with the tank or vessel upon which direct flotation vessel 100 is mounted.

Zone 2 can be referred to as a first pipe or water flush section 28. In the attached figures first pipe or water flush section 28 is a cylindrical section having a generally constant diameter that approximates the diameter of second end 27 of first conical section 25. It should be noted that section 28 could also be a different geometric shape to achieve the desired cross-sectional area required to produce the necessary velocity. In first pipe section 28, a number of nozzles 50, approximately equally spaced apart from each other in the vertical direction, introduce flush water into the product stream. The purpose of the flush water is to displace entrained slurry (and potentially hydrophilic particles) that has been carried into the upward-flow zone. The flush water may be provided by the water within a slurry that is either pumped into first pipe section 28 or fed by gravity. First pipe section 28 has an upstream end 29 and a downstream end 30. Upstream end is in fluid communication with second end 27 of first conical section 25.

It should be noted that direct flotation device or vessel 100 can function without water flush pipes and without nozzles 50, and that the air rate and product slurry flow can be controlled to produce a product with a high percentage solids. Such a product would be suitable for feeding to a filter and thereby bypassing the concentrate thickener stage.

Zone 3 can be referred to as a secondary diameter-reduction zone. After leaving Zone 2 (first pipe section 28), the product stream enters into a second or secondary diameter-reduction zone for further velocity increase. A net upward velocity of the combined product stream (bubble-particle aggregate plus carrier medium) in the region of 0.5 to 1.5 m/s may be targeted (depending on product characteristics). However, those skilled in the art will appreciate that in some instances velocities outside this range could also be employed. As in the case of first conical section 25, secondary diameter reduction zone 3 may be in a variety of different forms, including a cone where the diameter is steadily reducing according to the cone angle. In the depicted figures secondary diameter-reduction section 3 is in the form of a second conical section 31 having an upstream end 32 with a diameter larger than its downstream end 33. The diameter of upstream end 32 approximates that of first pipe section 28. Upstream end 32 is in fluid communication with downstream end 30 of first pipe section 28.

As mentioned, zone 4 may be comprised of one or more sub-zones or sections. As the product stream leaves secondary diameter reduction section 3 it enters the final top section or sections of direct flotation device 100, still maintaining a bubbly-flow regime. Once again no froth is created nor is any froth present in this zone. The product stream is instead in the form of a slurry containing relatively small bubbles, many of which will be adhered to hydrophobic particles. The precise configuration of bubbly-flow section 4 can be altered from one application to the next. In FIG. 1 zone or section 4 is shown as being comprised generally of three separate sub-zones or sub-sections 4a, 4b and 4c respectively. The function of the sub-zones or sub-sections is to deliver the product stream, still in bubble-flow regime, via the top of the direct flotation device, to a discharge. All, or essentially all, gas bubbles, and all of the solid particles attached to them, report to the concentrate product. Typically, the product stream will remain in bubble-flow regime at all times as it passes through these sections. It will be appreciated that the configuration of zone or section 4, as shown in FIG. 1, is simply illustrative. For example, zone 4 could consist of zone 4a immediately followed by a control valve, in which case there would typically be included a top plate and a section to collect the product slurry. In the embodiment shown in FIG. 1, zone 4 is in the form of a second pipe section 34 having a first upstream end 35 in fluid communication with downstream end 33 of second conical section 31. Second pipe section 34 further has a second or downstream end 36 that comprises the discharge end of direct flotation device or vessel 100. Typical $E_g$ in zone or section 4 will be 30% to 70%, however, $\varepsilon_g$ could also be extended outside that range.

Zone 5 can be referred to as product flow rate measurement and control section 5. A feature of an embodiment of the invention is that the product flow rate is controlled to a set-point, determined for each particular application. Product flow rate can be controlled through various mechanical means (e.g. regulating valve, variable-speed pump, etc) based on a measured or inferred measure of the product volumetric or mass flow rate, and/or density measurements. Manipulation of the production rate (Qc) dictates adjustments in Qg and Qww in order to maintain the Rcg, water flush efficiency and Yb ratios within required targets. In the embodiment shown, zone 5 includes a control valve 37 in fluid communication with second or downstream end 36 of second pipe section 34.

Sections 2 and/or 3 may further include a window 51 to allow for visualization of the bubbly flow with a camera and analysis with an image software system. Among other things, the image analysis could measure bubble velocity and gas holdup, either of which could be a control set point for the product flow control valve.

Sections 2, 3 and 4 may also include pressure sensors (generally 52) that may be separated vertically by a fixed distance. The combination of two pressure signals can be used to estimate system density and gas holdup in the respective zones.

Figure 2:
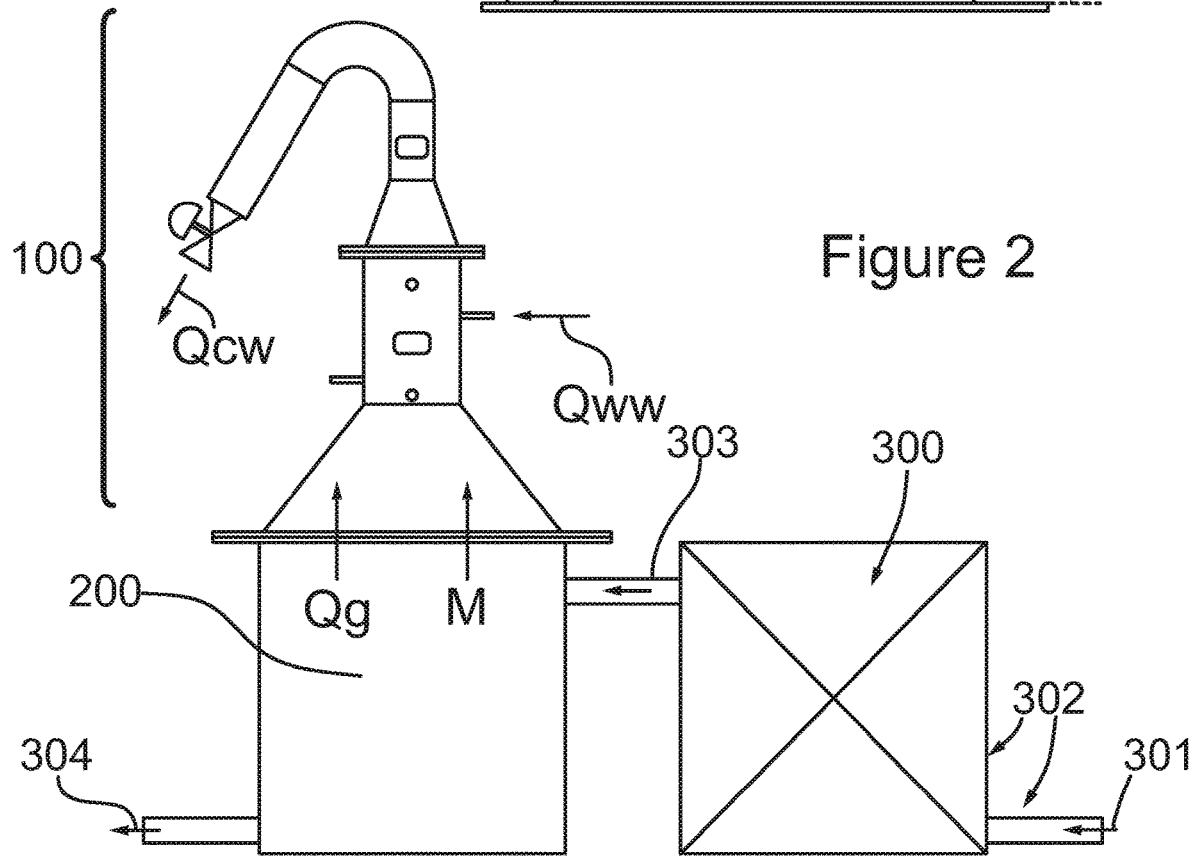
FIG. 2 is a schematic drawing of an embodiment of the invention shown in context with the components of a complete flotation unit.

FIG. 2 illustrates the application of direct flotation device 100 in accordance with an embodiment of the invention within the context of a complete flotation system. In this embodiment the flotation system generally comprises three primary components or regions, namely, direct flotation device or vessel 100, quiescent or gas/slurry disengagement vessel 200, and a vessel or region 300 for gas/slurry contact (which may also be referred to as a bubble engagement tank or vessel) into which slurry is fed. In this embodiment feed slurry enters vessel 300 through pipe or port 301. Gas at a flow rate of $Q_g$ is injected at 302. Following particle collection within vessel 300, the combined gas and slurry exits through piping 303 to quiescent vessel 200 for gas-slurry disengagement. Within this vessel the bulk of the gas bubbles, together with their attached mineral particles and a portion of slurry which is entrained within the gas-mineral particle system, is directed to direct flotation device 100. A portion of the slurry may also exit the flotation system as tailings at this stage through outlet 304. Product flow entering direct flotation device 100 will then undergo direct flotation as described herein.

FIG. 3 illustrates direct flotation in the context of multiple flotation units in series, with the tailings discharged from a first flotation unit or apparatus representing the feed for an adjacent downstream flotation unit. The multiple flotation units could be a rougher flotation operation; a scavenger flotation operation; or any stage of cleaner or cleaner-scavenger flotation operation. The direct flotation aspect is not specific to any one or more particular flotation duties, and can be applied to any of, or all flotation duties. FIG. 3 is simply demonstrative of a generic segment of a flotation operation which could comprise any number of flotation units in series, or in parallel. Direct flotation in accordance with the present invention presents an opportunity to (i) gang multiple units together on the same level; (ii) control multiple units with only one tailings valve and a header tank (or pump); (iii) measure and precisely control the product mass production from individual flotation units; and (iv) apply water flush to a unit in a flotation application across a complete circuit. The feed is usually, but not necessarily, by gravity from a feed tank 400 through conduit 401 into the first cell, with enough head pressure to overcome pressure drop through the system. Feed pressure can also be applied through other means, such as a pump. Gas is injected at 402. Concentrate exits at 403 and tailings exit through tailings control valve 404.

Figure 5:
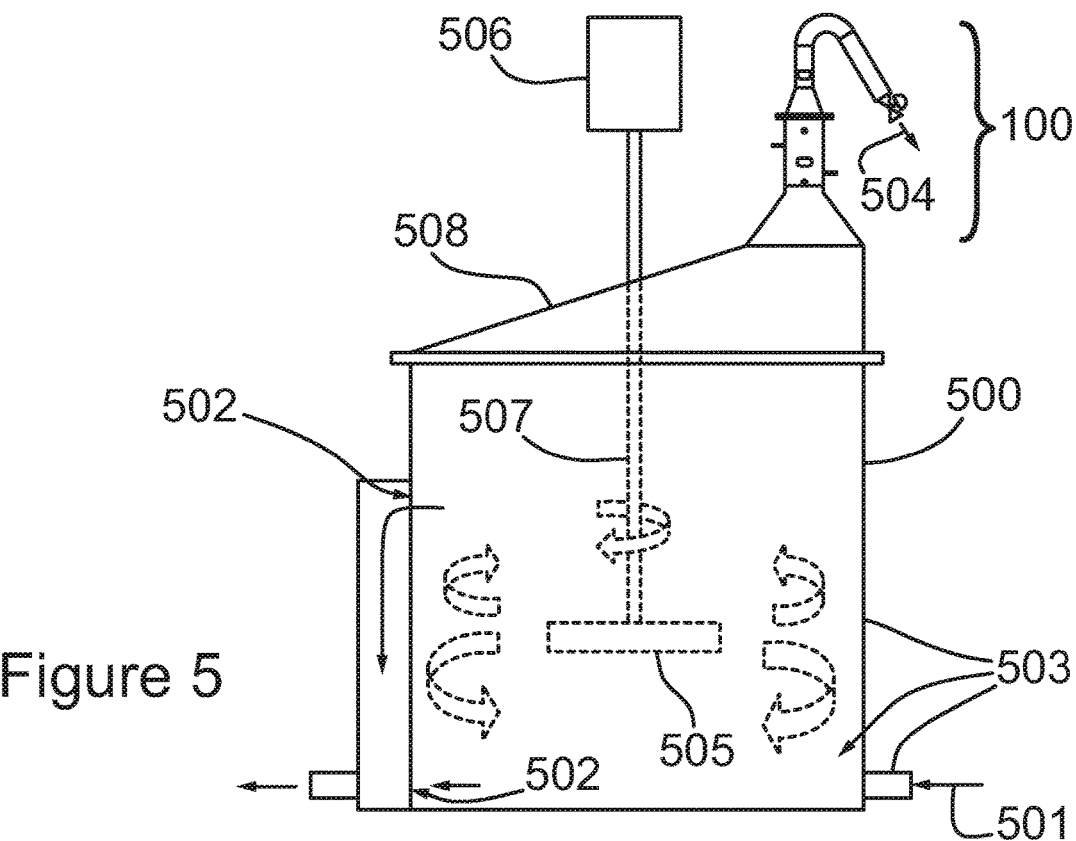
Figure 6:
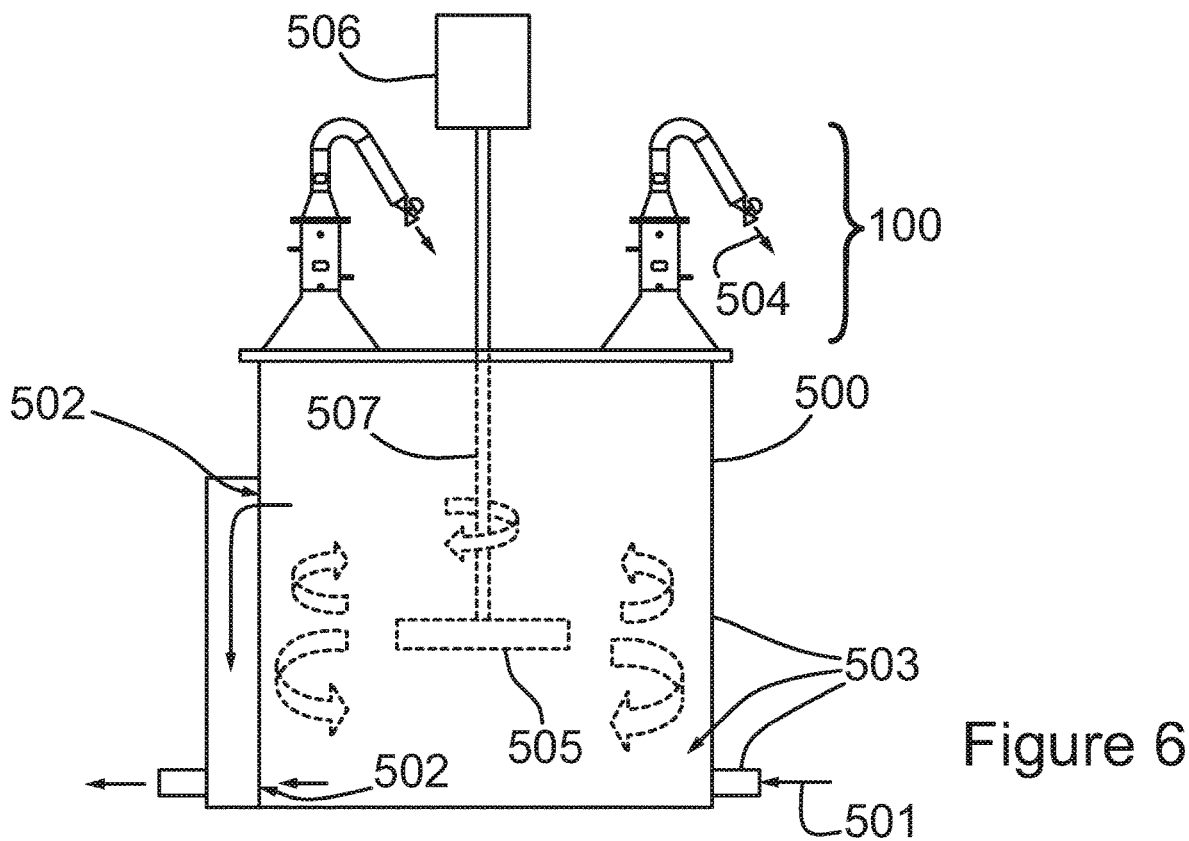

In a further embodiment of the invention gas/slurry contacting vessel 300 and gas/slurry disengagement vessel 200 can be combined into a single tank or vessel 500 as illustrated in FIG. 4. This arrangement is somewhat similar to the construction of a conventional flotation cell. However, here there will be a port 501 for feed slurry, two ports 502 for tailings slurry (upper and lower), and a port or ports 503 for air addition, all included in one tank. Of significance is that in this embodiment the top of the single tank is sealed and one or more assemblages of direct flotation device 100 are installed at the top. FIGS. 5 and 6 show two further alternate arrangements. In all cases, slurry is discharged from both the bottom port and a side port in the upper section of the vessel. Concentrate will exit direct flotation device 100 at 504. Further, and as in all embodiments of direct flotation device 100 no froth is created and no slurry froth interface will be present.

Each of FIGS. 4 through 6 also depict a generic mechanical agitator or shear element 505, typically driven by an electric motor 506, for assisting in bubble formation and to encourage the attachment of bubbles to hydrophobic particles. It will be appreciated that in some instances it may be desirable to optionally inject gas down the agitator shaft 507, as is common in the industry. It will be further appreciated that the particular form of agitation and gas injection is not critical to the invention or to the operation of direct flotation device 100. Similarly, the particular form and nature of quiescent or gas/slurry disengagement vessel 200, and vessel or region 300 for gas/slurry contact is not critical to the invention. In the case of vessel 300 for gas/slurry contact, any one of number of commonly utilized prior vessels, including those described in U.S. Pat. No. 5,096,572, could serve the desired function.

As noted, one or more direct flotation devices 100 may be positioned at the top of tank 100. For example, FIGS. 4 and 5 show embodiments where a single direct flotation device is utilized, whereas in FIG. 6 two separate direct flotation devices are mounted at the top of vessel 500. In addition, FIGS. 5 and 6 demonstrate that direct flotation device 100 need not be centrally positioned at the top of vessel 500. In the case of FIG. 5, direct flotation device 100 is offset to one side of the top of vessel 500. The upper surface 508 of vessel upon which direct flotation device 100 is mounted may be sloped to encourage flow into direct flotation vessel 100.

Figure 7:
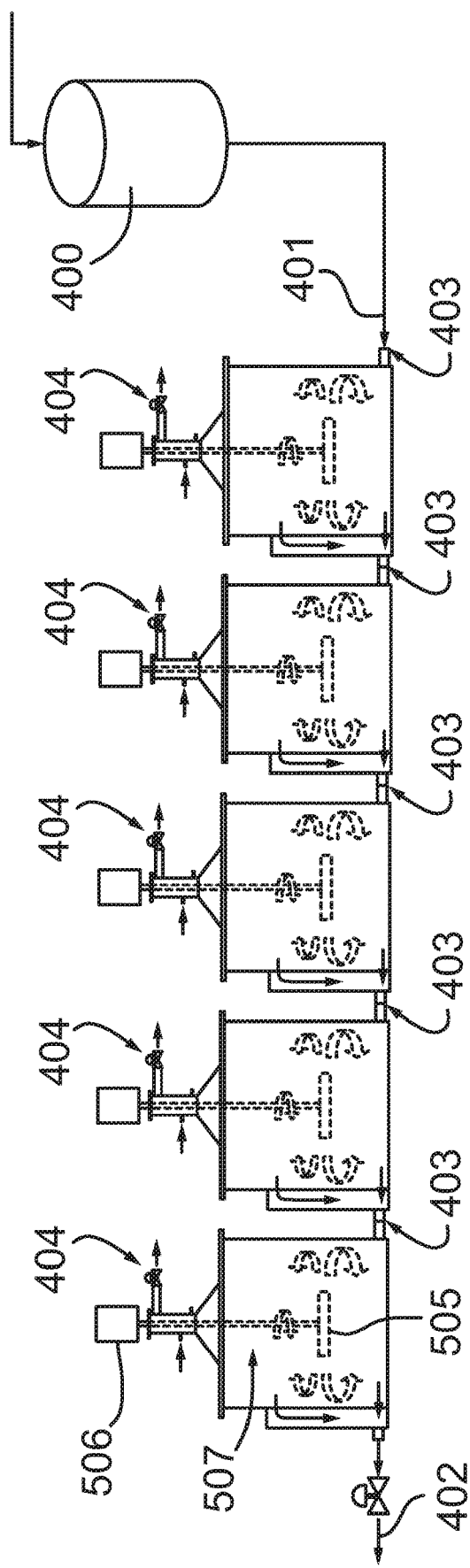
FIG. 7 illustrates, schematically, a series of single tank flotation units (as illustrated in FIG. 4) connected in series.

FIG. 7 illustrates, schematically, a series of single tank flotation units (as illustrated in FIG. 4) connected in series. It will be appreciated that the arrangement shown in FIG. 7 will present the same or similar properties and advantages as the series arrangement illustrated in FIG. 3. One of skill in the art will also understand that the opportunity to gang multiple units together with a single tailings valve can have an advantage in reducing the vertical height and horizontal length of a bank of flotation units which would comprise one flotation section (a rougher section, a scavenger section or a cleaner section). This, in turn, can reduce plant foot-print, installation costs and other infrastructure costs (building height, cranage, pumping requirements, etc.). Direct flotation can also be used with step heights between cells.

It will further be appreciated that the opportunity to apply flush water to the product stream of a unit utilizing direct flotation in accordance with the invention can have significant advantages. The flush water is applied into a restricted diameter zone in the invention, where the product stream is in a bubbly flow regime at high gas holdup (typically 30 to 70%). The flush water displaces the entrained water that had entered into that zone from the gas/slurry disengagement section. One of ordinary skill will understand that water flush in the context of direct flotation can be applied to virtually any flotation stage in a complete circuit.

Water flushing, in the form of water with no solids or water as contained in a slurry of previously generated product, can be introduced into water flush section 2 in a wide variety of different manners using a variety of different piping or other structures. FIG. 1 shows one possible option where water is injected by means of a piping manifold which directs the water through individual pipes/nozzles perpendicular to section 2. The number and size of pipes delivering water can, and will in most instances, vary depending on the particular application at hand. It is generally preferable to apply a gentle, low pressure, injection of water.

From a thorough understanding of the above described invention it will be appreciated that the invention may help to reduce or eliminate mineral loss as a result of particle drop-back across a slurry/froth interface. The invention may also minimize or eliminate mineral loss as a result of bubble coalescence within a froth phase. The invention may further minimize gangue entrainment dilution of the product stream through the injection of a flush water phase into the product bubbly flow stream. Water recovery into the product stream may be reduced through minimization of the gas rate (Qg) and control of the Gas Rate ratio (Rcg).

It will further be appreciated that operation of the direct flotation device described will serve to eliminate the need for level sensing as well as the need for an associated level control valve, features required on current flotation machines.

REFERENCES (THE CONTENTS OF WHICH ARE INCORPORATED HEREIN BY REFERENCE)

WO 2011/094842; Dobby, G. S. and Kosick, G. A., 2011.

Falutsu, M., Dobby, G. S., 1989. Direct measurement of froth dropback and collection zone recovery in a laboratory flotation column. Minerals Engineering 2 (3), 377-386.

Finch, J. A. and Dobby, G. S. "Column Flotation," Pergamon Press, London, ISBN 0-08-040186-4. (1990).

We claim:

1. An apparatus for use in the recovery of hydrophobic particles from a slurry that is comprised of water, hydrophobic particles, and a hydrophilic component, the apparatus comprising:
   (i) a bubble engagement tank into which the slurry is fed, said bubble engagement tank including an air injector to inject air into slurry received within the bubble engagement tank to permit gas bubbles to adhere to hydrophobic particles within the slurry, and
   (ii) a direct flotation vessel in fluid communication with the bubble engagement tank, said direct flotation vessel comprising a first or intake end in fluid communication with said bubble engagement tank, at least one reduced diameter section, and a control valve in fluid communication with said reduced diameter section and representing the sole mechanism for the exit of material passing through the direct flotation vessel to an exterior atmosphere such that said direct flotation vessel is sealed from the atmosphere other than through the control valve, and such that operation of said control valve controls the amount of flow through said direct flotation vessel when slurry from the bubble disengagement tank flows there through,
   wherein at least one of the at least one reduced diameter sections of the direct flotation vessel, together with the control valve, are constructed to maintain the pressure of that portion of the slurry passing through the direct flotation vessel above atmospheric to maintain a bubbly flow without the formation of a slurry froth interface or a froth component, and
   wherein all flow passing through the direct flotation vessel is discharged in a single stream through said control valve.

2. The apparatus as claimed in claim 1 wherein said bubble engagement tank includes a tailings discharge outlet.

3. The apparatus as claimed in claim 2 wherein the bubble engagement tank includes a mechanical agitator or a shear element for bubble formation and to encourage the attachment of bubbles to hydrophobic particles in the slurry.

4. The apparatus as claimed in claim 1 wherein the direct flotation vessel includes one or more wash water ports.

5. The apparatus as claimed in claim 1 wherein the direct flotation vessel includes one or more optical and/or pressure sensors generating a signal indicative of the extent of bubbly flow within the direct flotation vessel, said signal controlling said control valve to maintain pressure within the direct flotation vessel above atmospheric and to prevent the formation of a froth component.

6. The apparatus as claimed in claim 1 having a plurality of direct flotation vessels in fluid communication with said bubble engagement tank.

7. The apparatus as claimed in claim 1 wherein the direct flotation vessel is in fluid communication with the top of the bubble engagement tank, at least a portion of the top of the bubble engagement tank sloped to encourage the flow of slurry into the direct flotation vessel.

8. The apparatus as claimed in claim 1 wherein said intake end of said direct flotation vessel is in the form of a cone in fluid communication with the top of said bubble engagement tank.

9. A flotation system comprising two or more of the apparatuses of claim 8 in a serial fluid communication such that tailings discharged from a first apparatus is the feed introduced into an adjacent second apparatus.

10. An apparatus for use in the recovery of hydrophobic particles from a slurry that is comprised of water, hydrophobic particles, and a hydrophilic component, the apparatus comprising:
   (i) a bubble engagement tank into which the slurry is fed, said bubble engagement tank tank to permit gas bubbles to adhere to hydrophobic particles within the slurry,
   (ii) a direct flotation vessel in fluid communication with the bubble engagement tank, said direct flotation vessel having (a) a first or intake end in fluid communication with said bubble engagement tank, (b) a first conical section having a first end of a diameter larger than a second end, said first end of said first conical section comprising said intake end of said direct flotation vessel and in fluid communication with the bubble engagement tank, (c) a first pipe section of a generally constant diameter approximating the diameter of said second end of said first conical section, said first pipe section having an upstream end in fluid communication with said second end of said first conical section, (d) a second conical section having an upstream end of a diameter larger than a downstream end, the diameter of said upstream end of said second conical section approximating the diameter of said first pipe section, said upstream end of said second conical section in fluid communication with a downstream end of said first pipe section, (e) a second pipe section having a first end, in fluid communication with said downstream end of said second conical section, and having a second end comprising a discharge end; and,
   (iii) a control valve in fluid communication with said discharge end such that operation of said control valve controls the amount of flow through said direct flotation vessel when slum from the bubble disengagement tank flows there through.

11. The apparatus as claimed in claim 10 wherein the control valve is sized to maintain the pressure of that portion of the slurry passing through the direct flotation vessel above atmospheric to maintain a bubbly flow without the formation of a slurry froth interface or a froth component.

12. The apparatus as claimed in claim 11 wherein the control valve represents the sole mechanism for the exit of material passing through the direct flotation vessel to the atmosphere such that entrained gas bubbles attached to hydrophobic particles passing through the direct flotation vessel are discharged through the control valve.

13. An apparatus for use in the recovery of hydrophobic particles from a slurry that is comprised of water, hydrophobic particles, and a hydrophilic component, the apparatus comprising:
   (i) a bubble engagement tank into which the slurry is fed, said bubble engagement tank including an air injector to inject air into slurry received within the bubble engagement tank to permit gas bubbles to adhere to hydrophobic particles within the slurry,
   (ii) a direct flotation vessel in fluid communication with the bubble engagement tank, said direct flotation vessel having (a) a first or intake end in fluid communication with said bubble engagement tank, (b) a first conical section having a first end of a diameter larger than a second end, said first end of said first conical section comprising said intake end of said direct flotation vessel and in fluid communication with the bubble engagement tank, and (c) a first pipe section of a generally constant diameter approximating the diameter of said second end of said first conical section, said first pipe section having an upstream end in fluid communication with said second end of said first conical section, and having a second end comprising a discharge end; and,
   (iii) a control valve or flow restrictor in fluid communication with said discharge end and representing the sole mechanism for the exit of material passing through the direct flotation vessel to the atmosphere such that said direct flotation vessel is sealed from an exterior atmosphere other than through the control valve or flow restrictor, the control valve or flow restrictor controlling the amount of flow through said direct flotation vessel when slurry from the bubble disengagement tank flows there through.

14. The apparatus as claimed in claim 13 wherein the control valve or flow restrictor is sized to maintain the pressure within the direct flotation vessel above atmospheric to maintain a bubbly flow without the formation of a slurry froth interface or a froth component.

* * * * *